(12) United States Patent
Yeh et al.

(10) Patent No.: US 6,542,073 B2
(45) Date of Patent: Apr. 1, 2003

(54) SYSTEM AND METHOD FOR SENSING VEHICLE ROLLOVER

(75) Inventors: Huahn-Fern Yeh, Novi, MI (US); Chek-Peng Foo, Ann Arbor, MI (US); Steven Michael Cash, Cedar Falls, IA (US); Shun-Hsin Chang, Novi, MI (US); Flora Maior, Sterling Heights, MI (US)

(73) Assignee: TRW Inc., Lyndhurst, OH (US)

( * ) Notice: Subject to any disclaimer, the term of this patent is extended or adjusted under 35 U.S.C. 154(b) by 17 days.

(21) Appl. No.: 09/742,566

(22) Filed: Dec. 20, 2000

(65) Prior Publication Data

US 2002/0075140 A1 Jun. 20, 2002

(51) Int. Cl.⁷ .................................................. B60Q 1/00
(52) U.S. Cl. ....................... 340/440; 340/438; 340/439; 340/471; 340/472; 340/903; 701/36; 701/38; 701/45; 701/110
(58) Field of Search ................................ 340/440, 438, 340/471, 472, 903, 439; 701/36, 38, 45, 110; 180/252; 280/756

(56) References Cited

U.S. PATENT DOCUMENTS

| 5,391,845 A | 2/1995 | Haas et al. ........... 200/61.45 R |
| 5,553,924 A | 9/1996 | Cantor et al. .......... 297/452.27 |
| 5,610,575 A | 3/1997 | Gioutsos ...................... 340/429 |
| 5,825,284 A | 10/1998 | Dunwoody et al. ......... 340/440 |
| 5,835,873 A | 11/1998 | Darby et al. .................... 701/45 |
| 5,890,084 A | 3/1999 | Halasz et al. ................. 701/45 |
| 6,002,974 A | * 12/1999 | Schiffmann ................. 340/440 |
| 6,081,188 A | * 6/2000 | Kutlucinar et al. ......... 340/438 |
| 6,092,005 A | * 6/2000 | Okada ......................... 340/439 |
| 6,130,608 A | * 10/2000 | McKeown et al. ......... 340/438 |
| 6,170,594 B1 | * 1/2001 | Gilbert ....................... 180/282 |
| 6,192,305 B1 | 2/2001 | Schiffmann |

OTHER PUBLICATIONS

An article by BEI Systron Donner Inertial Division entitled "GyroChip™ Industrial 'Solid–State' Rotation Sensor," dated Feb. 21, 1994.

\* cited by examiner

Primary Examiner—Daniel J. Wu
Assistant Examiner—Hung T Nguyen
(74) Attorney, Agent, or Firm—Tarolli, Sundheim, Covell & Tummino L.L.P.

(57) ABSTRACT

A rollover sensing system (10) includes a roll rate sensor (14) operative to sense a roll rate of rotation of a vehicle (12) and to provide a roll rate signal having an electrical characteristic indicative thereof. A controller (26) is connected to the roll rate sensor (14) and is operative to determine a roll angle of the vehicle (12) based on the roll rate signal. The controller (26) includes a threshold having a value functionally related to roll angle. The controller (26) determines the occurrence of a vehicle rollover condition in response to the sensed roll rate crossing the threshold.

13 Claims, 6 Drawing Sheets

SYSTEM AND METHOD FOR SENSING VEHICLE ROLLOVER

TECHNICAL FIELD

The present invention relates to occupant protection and, more particularly, to a system and method for sensing a vehicle rollover condition for helping protect a vehicle occupant.

BACKGROUND OF THE INVENTION

In order to detect a vehicle rollover condition, a vehicle may be equipped with one or more sensors for detecting the occurrence of vehicle rollover. The sensors typically are connected to a controller that controls actuation of one or more actuatable devices, such as an occupant restraint, to help cushion and/or restrain the occupant during vehicle rollover.

For example, U.S. Pat. No. 5,825,284 discloses a vehicle rollover system having a sensor that provides a signal indicative of lateral acceleration of the vehicle. A processor calculates a roll moment based on the sensor signal, which provides a visual display indicating the likelihood of vehicle rollover. Various devices also have been proposed for detecting an angular orientation of an object. For example, U.S. Pat. No. 5,329,121 to Leviton, U.S. Pat. No. 4,207,463 to Iyeta, U.S. Pat. No. 5,670,780 to Lewis, U.S. Pat. No. 5,103,090 to Weiner et al., and U.S. Pat. No. 4,320,293 to Guretzky each discloses a measuring device that senses angular rotation of a body using optical emitters and detectors.

SUMMARY OF THE INVENTION

One aspect of the present invention provides a rollover sensing system that includes a roll rate sensor operative to sense a rate of vehicle rotation about an axis extending through the vehicle and to provide a roll rate signal having an electrical characteristic indicative of the sensed rate of vehicle rotation. A controller is connected to the roll rate sensor and is operative to determine a roll angle of the vehicle based on the roll rate signal. The controller includes a threshold having a value functionally related to roll angle. The controller determines the occurrence of a vehicle rollover condition in response to the sensed roll rate crossing the threshold.

Another aspect of the present invention provides a method for sensing a vehicle rollover condition. The method includes the steps of sensing a roll rate of rotation of the vehicle and determining a roll angle based on the sensed roll rate. A roll rate threshold is provided which has value is functionally related to roll angle. A control signal is provided in response to determining that the sensed roll rate crosses the roll rate threshold.

BRIEF DESCRIPTION OF THE DRAWINGS

The foregoing and other features and advantages of the invention will become more apparent to one skilled in the art upon consideration of the following description of the invention and the accompanying drawings in which.

DESCRIPTION OF AN EXEMPLARY EMBODIMENT

Figure 1:
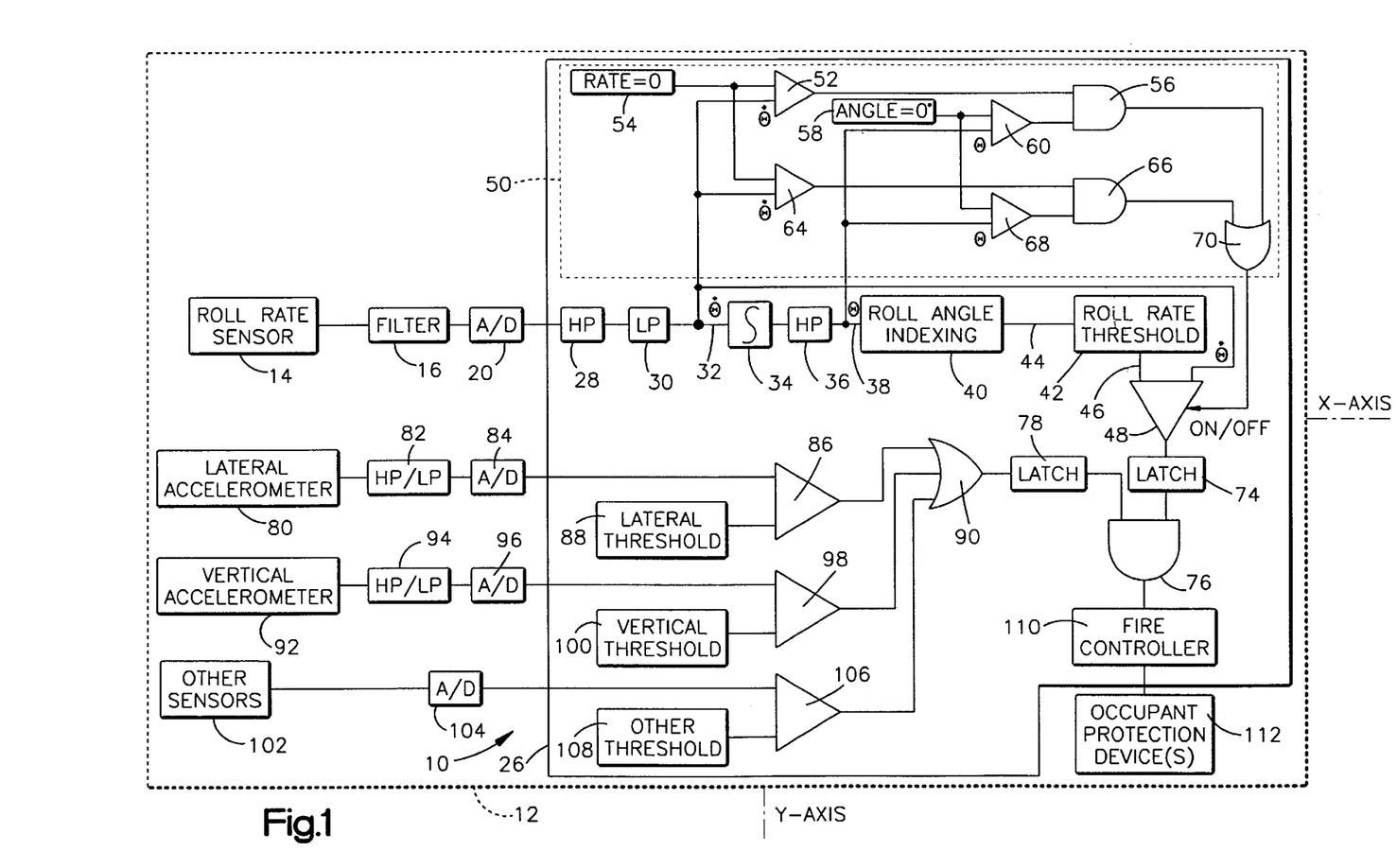
FIG. 1 is a block diagram of a system in accordance with an exemplary embodiment of the present invention.

FIG. 1 illustrates an occupant protection system 10, in accordance with the present invention, which is mountable in a vehicle 12. The system 10 includes a roll rate sensor 14 which is operative to sense a roll rate of rotation of the vehicle 12 about an axis of the vehicle. The roll rate sensor 14 may be mounted in the vehicle 12, such as at central vehicle location, so as to sense a rate of vehicle rotation about a longitudinal axis of the vehicle (e.g., an X-axis oriented parallel to a direction of travel or front-to-aft), and/or about an axis transverse to the X-axis of the vehicle (e.g., a Y-axis extending laterally through the vehicle 12 substantially perpendicular to the X-axis).

By way of example, the roll rate sensor 14 may be a microminiature structure configured to sense angular velocity (e.g., roll rate of a vehicle) and fabricated using semiconductor manufacturing techniques. An example of such a sensor is the GYROCHIP™ industrial solid state rotation sensor, which is commercially available from BEI Sensors and Systems Co. of Concord, Calif. The GYROCHIP™ sensor uses the Coriolis effect to produce a DC voltage having a value proportional to the rate of rotation about an axis of the sensor. Accordingly, upon sensing a rate of angular rotation in first direction about its axis, the DC output signal from the sensor (e.g., 14) is positive. Similarly, an angular rate of rotation in the other direction about the sensor axis provides a negative sensor output signal. Thus, the magnitude of the sensor output signal indicates the rate of rotation and the sign indicates the angular direction or the rotation rate relative to the sensor axis.

Referring back to FIG. 1, the roll rate sensor 14 outputs a signal to an analog filter 16 having an electrical characteristic indicative of the sensed rate of rotation. The filter 16 is selected so as to remove frequency components from the roll rate sensor signal that are not useful in discriminating a vehicle rollover condition. The filter 16 provides a filtered roll rate signal to an appropriate analog-to-digital (A/D) converter 20. The A/D converter provides a digitized, filtered signal to a controller 26 of the system 10. The A/D converter 20 is illustrated as being external to the controller 26, although it, alternatively, could be an integral part of the controller.

The elements shown in the controller block 26 correspond with operations performed internally by the controller. The controller 26, for example, is a microcomputer programmed to perform the illustrated operations. Such functions alternatively could be performed with discrete circuitry, analog circuitry, a combination of analog and discrete components and/or an application specific integrated circuit.

Additional digital filtering of the roll rate signal preferably occurs at the controller 26. In particular, A/D converter 20 provides the digitized signal to a digital high pass ("HP") filter function 28. The high pass filter function 28 may, for example, be selected to have a time constant which results in resetting the filter function after a predetermined time period, such as about three seconds.

The high pass filter function 28 provides a signal to a low pass ("LP") filter function 30. The low pass filter function 30 smoothes the roll rate signal by removing noise and other high frequency components that are not useful in determining a vehicle rollover condition. The low pass filter function 30 provides a smoothed signal 32 to an integrator function 34 having a value indicative of vehicle roll rate (i.e., angular velocity). The integrator function 34, in turn, integrates the signal 32 from the low pass filter function 30 to provide a value indicative of a determined relative roll angle of the vehicle 12 that is determined based on the roll rate value 32.

The output of the integrator function 34 is digitally high pass filtered by a high pass filter function 36, which could be performed as part of the integrator function 34. The high pass filter function 38 provides a signal having a value 38 indicative of a normalized roll angle of the vehicle 12 that is functionally related to the roll rate value 32. Specifically, the roll angle value 38 indicates a relative amount of angular rotation of the vehicle in response to a sensed roll rate. The roll angle value 38 may be reset based on a time constant selected for the filter function 36, so that the roll angle value 38 provides an indication of angular rotation during the occurrence of a detected roll rate. The roll angle value 38, thus, may not indicate the actual angular orientation of the vehicle 12 relative to the ground. In this way, the determination of a vehicle rollover condition need not depend on a determination of an initial angular orientation of the vehicle relative to the ground or road.

The roll angle value 38 from the high pass filter function 36 is provided to a roll angle indexing function 40. The roll angle indexing function 40 is configured to, in accordance with the present invention, index a roll rate threshold determining function 42. The indexing function 40 divides the determined roll angle value into discrete roll angle index values 44 that are provided to the roll rate threshold function 42. The roll rate threshold function 42, for example, is a look-up table that contains values of a variable roll rate threshold which are stored as a function of roll angle. The variable roll rate threshold function 42 provides a roll rate threshold value 46 functionally related to the index value 44 provided by the indexing function 40. Alternatively, the threshold value 46 could be calculated based on the roll angle index value using predetermined equations.

The roll rate threshold determining function 42 provides the threshold value 46 to an input of a comparator function 48. The filtered roll rate value 32 from the low pass filtering function 30 is provided to another input of the comparator function 48. The comparator function 48 provides an output based on a comparison of the filtered roll rate value 32 and the roll rate threshold value 46, which is determined based on the roll angle index value 44. Specifically, the comparator function 48 provides an output signal having a digital logic level (e.g., TRUE or FALSE) that indicates whether the filtered roll rate value 32 from low pass filter function 30 crosses or, more particularly, exceeds the indexed threshold value 46.

Figure 2:
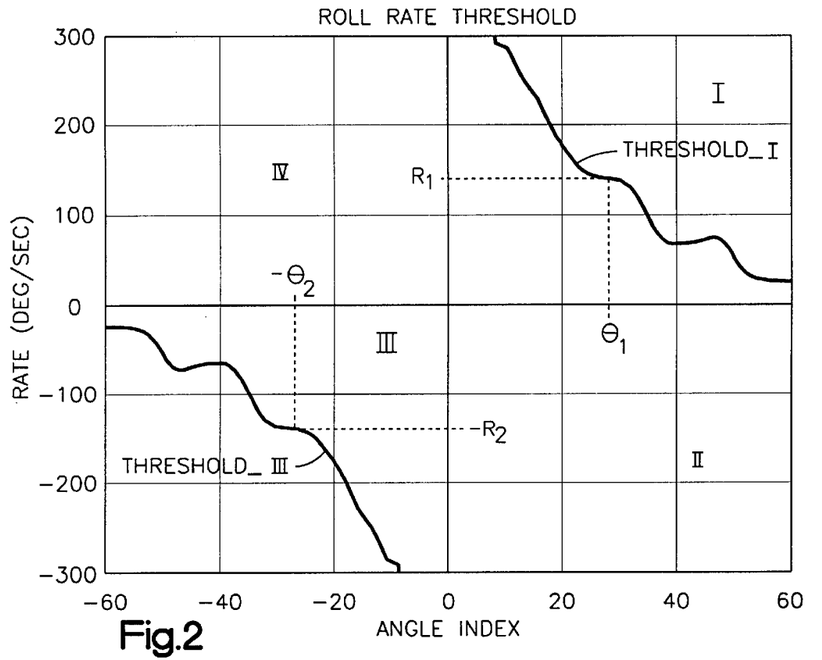
FIG. 2 is a graphical representation of a variable threshold value for use in the present invention, with roll rate being on the Y-axis and roll angle index being on the X-axis.

An example of threshold values for the roll rate threshold determining function 38 is illustrated in FIG. 2 for a particular vehicle platform. Roll rate threshold values are provided only in quadrants one ("I") and three ("III") of the graphical representation, indicated respectively at THRESHOLD_I and THRESHOLD_III. Quadrant one represents a vehicle condition when both the determined relative roll angle and roll rate have positive values. Similarly, quadrant three corresponds to when both the determined relative roll angle and the roll rate both have negative values. The second and fourth quadrants represent situations when the vehicle 12 is returning to a normal angular orientation relative to the ground. Accordingly, it is desirable to perform the comparison function 48 only when the roll rate signal and the indexed roll angle have values that define a point that lies in quadrants I or III (e.g., both the roll rate and roll angle have the same sign).

To this end, a quadrant detection rollover algorithm 50 is used to determine whether the roll rate and roll angle values are both in quadrant one or are both quadrant three. This condition is met provided that, for example, (i) the roll angle value 38 is greater than or equal to 0° and the roll rate value 32 is greater than or equal to 0° per unit time or (ii) the roll angle value 38 is less than or equal to 0° and the roll rate value 32 is less than or equal to 0° per unit time.

By way of example, the roll rate value 32 is provided to an input of a comparator function 52. Within a microcomputer, the roll rate value 32 is a digital value that is compared to a reference value by a comparator function 52. A roll rate reference value 54 (e.g., 0°/second) is provided to another input of the comparator 52. The comparator 52 determines whether the roll rate value is greater than or equal to the reference value and provides a corresponding output to an input of an AND function 56. A roll angle reference value 58 (e.g., 0°) is provided to an input of a comparator function 60. The determined relative roll angle value 38 is provided to another input of the comparator function 60. The comparator 60 determines if the roll angle value 38 is greater than the reference value 58. The comparator 60 provides a digital output value to another input of the AND function 56 based on a comparison of the determined roll angle value 32 and the reference value 58. The AND function 56 provides a digital output signal (e.g., TRUE or FALSE) in response to the signals from the comparators 52 and 60.

Similar logic is provided to determine whether the roll rate and roll angle define a point lying in quadrant III. For example, the roll rate value 32 is provided to an input of a comparator function 64. The roll rate threshold value 54 is provided to another input of the comparator 64. The comparator 64 determines whether the roll rate value is less than or equal to the threshold value (i.e., has a negative value). The comparator function 64 provides a corresponding digital output signal to an input of an AND function 66. The roll angle reference value 58 also is provided to an input of another comparator function 68. The determined roll angle value 38 is provided to another input of the comparator function 68, which, in turn, provides a corresponding digital output signal to another input of the AND function 66. The AND function 66 provides a digital output signal (e.g., TRUE or FALSE) in response to the signals from the comparators 64 and 68.

Referring to FIG. 2 and assuming, for purposes of explanation, that the roll rate value 32 has a positive value $R_1$ and the roll angle value 38 also is positive value $\Theta_1$, then each of the comparators 52, 60 outputs a TRUE or HIGH condition to the AND function 56. The AND function 56, in turn, provides a digital TRUE output signal, which indicates that the roll rate value and the roll angle value define a point lying in quadrant I. The other part of the quadrant determination algorithm 50 (e.g., 64, 66, 68) performs a similar quadrant determination of whether the roll rate value 32 and the roll angle value 38 define a point lying in quadrant III.

Each of the AND functions 56, 66 provides a respective digital output signals to an associated input of an OR function 70. The OR function 70 controls operation of the comparator function 48. Specifically, the OR function 70 provides a control signal (e.g., ON or OFF) to the comparator function 48 for controlling operation of the comparator in response to the output values from the AND functions 56 and 66. For example, in the situation when AND function 56 provides a TRUE condition to the OR function 70 (e.g., roll rate and roll angle are in quadrant I), the OR function 70 provides a digital TRUE or ON output signal to a control input of the comparator function 48. This enables operation of the comparator function 48 to check the roll rate value 32 against the roll rate threshold value 46. The comparator function also is enabled when the AND function 66 provides a digital TRUE condition to the OR function 70. In a microcomputer embodiment of the system 10, the quadrant detection algorithm 50 and control of the comparator function would be implemented as software stored in appropriate memory. The control logic, for example, might be implemented using well known IF and THEN statements, although other logic operations also could be used.

The rollover comparator function 48 of the controller 26, thus, is operative to check the roll rate threshold only when the roll rate and roll angle have values that define a point in the first quadrant or in the third quadrant (e.g., see FIG. 2). This helps prevent against erroneously determining the occurrence of a vehicle rollover condition if the roll rate and roll angle values are in the second or fourth quadrants, as mentioned above. The roll rate thresholds in quadrants one and three also are determined, such as from empirical testing for a particular vehicle platform, so as to detect vehicle rollover for a plurality of different maneuvers which may result in a rollover condition.

Alternatively, a single set of roll threshold values, such as corresponding to THRESHOLD_I in quadrant I of FIG. 2, may be provided by the roll rate threshold determining function 42. In this alternative embodiment, the angle indexing function 40, for example, provides to the roll rate threshold function 42 an absolute value of the determined roll angle or disregards the sign. Accordingly, the comparator function 48 compares the magnitude of the roll rate signal against the corresponding indexed threshold value. A quadrant determination algorithm, such as 50 of FIG. 1, however, would still be used to control the comparator function 48 so that the roll rate value is compared against the indexed threshold only when the roll rate value and roll angle value define a point that lies in quadrant I or III.

Referring back to FIG. 1, the output of the comparator function 48 is provided to a latch function 74. The latch function 74 latches the comparator output to an input of an AND function 76 for a predetermined length of time, such as about one second. Another latch function 78 provides a signal to another input of the AND function 76, also for a predetermined time period of about one second. The signal from the latch function 78 represents a safing condition signal from one or more safing sensors.

By way of example, one safing sensor may include an accelerometer 80 operative to sense lateral acceleration of the vehicle (e.g., side-to-side acceleration in a direction parallel to the Y-axis) The lateral accelerometer 80 provides a signal having an electrical characteristic indicative of the lateral acceleration of the vehicle 12. The signal from the lateral accelerometer 80 is provided to a filter network 82 formed of an appropriate combination of high pass and low pass filters. Additional filtering also may occur within the controller 26, such as through digital filtering techniques.

The filter network 82 provides a filtered acceleration signal to an appropriate A/D converter 84. The A/D converter 84, in turn, provides the digitized signal to an input port of the controller 26. Specifically, the digitized signal is provided to an input of a comparator function 86. A lateral acceleration threshold function 88 provides to another input of the comparator function 86 a reference signal indicative of a lateral acceleration threshold value. The threshold of lateral acceleration is, for example, set from about 0.5 g to about 0.75 g (g being the value of acceleration due to earth's gravity, i.e., 32 feet per second squared or 9.8 m/s$^2$). This level of lateral acceleration helps ensure that this aspect of rollover safing will be triggered ON when the vehicle rolls about 30° or experiences severe cornering. The comparator function 86, in turn, provides a digital logic signal (e.g., indicating a TRUE or FALSE condition) to an input of an OR function 90 indicating whether the digitized lateral acceleration signal exceeds the lateral acceleration threshold value 88.

Another safing sensor is a vertical accelerometer 92. The vertical accelerometer 92 has an axis of sensitivity oriented vertically relative to a direction of travel of the vehicle 12 (e.g., extending up and down through the vehicle). The vertical accelerometer 92 provides a signal having electrical characteristic indicative of the vertical acceleration of the vehicle 12. The vertical accelerometer 92 provides the acceleration signal to an appropriate filter network 94 formed of high pass and low pass filters. The filter network 94 provides a filtered signal to an appropriate A/D converter 96. The A/D converter 96 provides a digitized indication of the vertical acceleration to an input of a comparator function 98. A vertical acceleration threshold function 100 provides a reference acceleration signal to another input of the comparator function 98. The vertical acceleration threshold function 100 provides an acceleration threshold value that is, for example, about twice that of the lateral acceleration threshold value 88, i.e., from about 1 to about 1.5 g. The comparator function 98 provides a digital output signal to another input of the OR function 90 indicating whether the sensed vertical acceleration exceeds the vertical acceleration threshold value 100.

Additional safing functions may be provided by other sensors 102, such as an angular sensor and/or one or more other acceleration sensing devices. The other sensors 102 provide a signal, which may be filtered (filter circuitry not shown), to an appropriate A/D converter 104. The A/D converter 104 provides a digitized signal to an input of another comparator function 106 indicative of the characteristic sensed by the sensor 102. A threshold function 108 provides a corresponding reference signal to another input of the comparator function 106. The comparator function 106 compares the digitized value of the sensor signal with the reference values provided by the reference threshold function 108 and provides a digital HIGH signal when the threshold is exceeded. When the other sensor 102 is a safing switch device, such as, for example, a switch responsive to inertia or angular orientation of the vehicle 12, a logic signal indicative of the state of such switch may be provided directly to an input of the OR function 90. A threshold is built directly into an electromechanical inertia switch or an electromechanical roll angle switch that closes contacts when a predetermined acceleration or roll angle is experienced.

The OR function 90 provides a digital output signal to the latch function 78, which indicates the Boolean result of ORing the signals from the respective safing comparator functions 86, 98, and 106. The latch function 78 is operative to latch the corresponding digital output signal to the AND function 76 for a predetermined time period, such as from about one to about two seconds. Because the safing signals are latched for a predetermined duration, there is an increased likelihood that a TRUE condition output signal from latch 78 will occur simultaneously with a TRUE condition output signal from the other latch function 74.

The signals from latch functions 74 and 78 are provided to the AND function 76. The AND function 76, in turn, provides a digital logic signal (e.g., TRUE or FALSE) indicating whether the roll rate exceeds the variable roll rate threshold 46 and at least one of the sensed safing conditions has been satisfied, i.e., the output of 48 is TRUE. Because the latch functions 74 and 76 latch their respective output signals for a predetermined time period, the occurrence of a vehicle rollover condition may be determined even if the safing comparator functions 86, 98, 106 do not provide TRUE condition output signals contemporaneously with the comparator function 48 providing a digital TRUE output signal. The output of the AND function is provided to a fire controller 110 which controls actuation of one or more occupant protection devices 112.

By way of example, the occupant protection device 112 could be an inflatable occupant protection device (e.g., an air bag or air curtain), a seat belt pretensioner device, an actuatable roll bar and/or other actuatable device capable of helping protect an occupant during a vehicle rollover condition.

Figure 3:
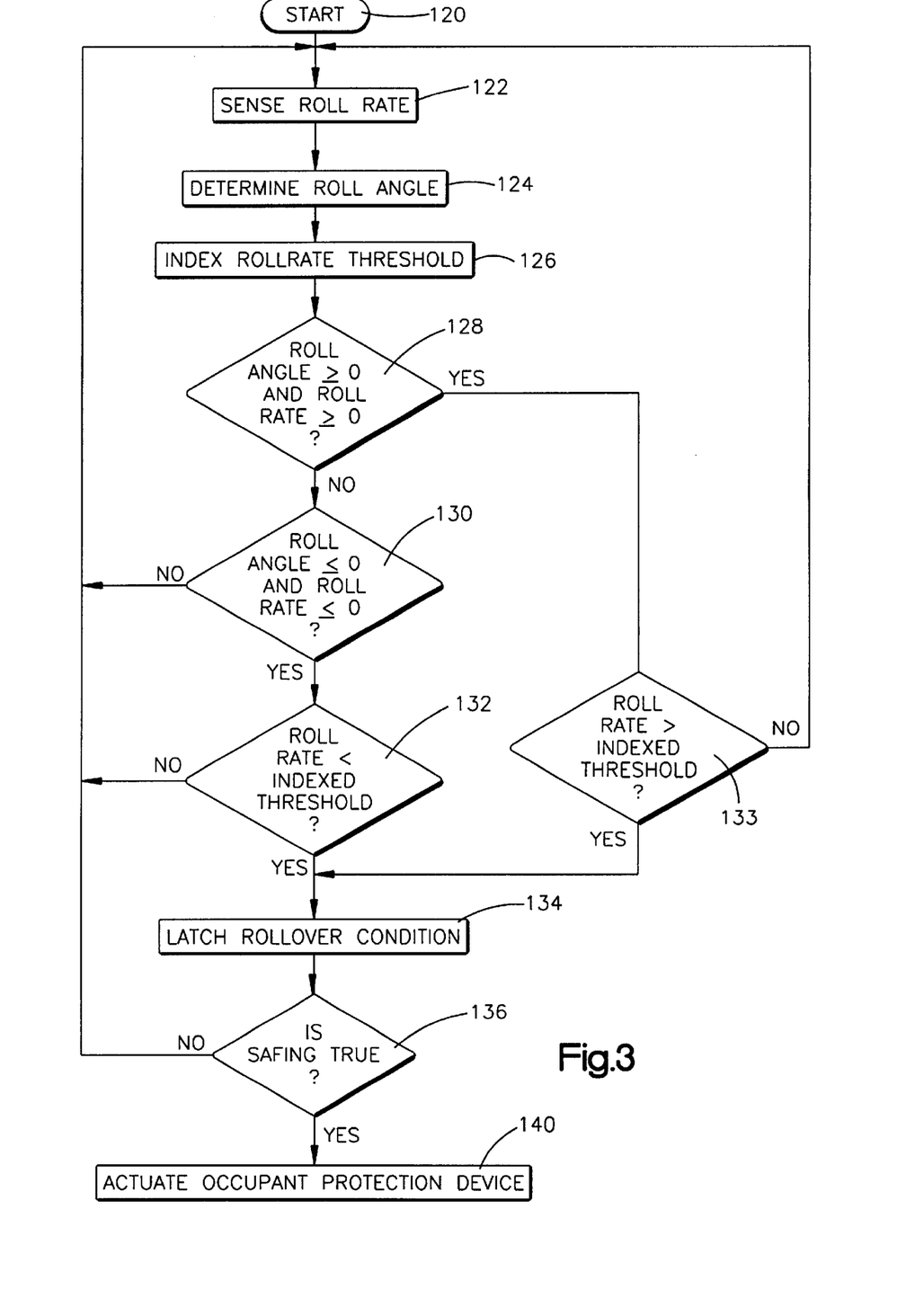
FIG. 3 is flow diagram illustrating operation of the system of FIG. 1.

In view of the foregoing structure described above, the operation of the system 10 of FIG. 1 will be better appreciated with respect to the exemplary flow diagram of FIG. 3. The process begins at step 120, such as at power-up, in which parameters are initialized and flag conditions are set to their starting values.

From step 120, the process proceeds to step 122 in which the roll rate of the vehicle is sensed. This is accomplished by the roll rate sensor (e.g., 14 of FIG. 1) sensing the roll rate of the vehicle and providing a roll rate signal to the controller (e.g., 26 of FIG. 1). Next, the process continues to step 124 in which a roll angle is determined. For example, this is accomplished by integrating the roll rate signal to provide an indication of the roll angle. The process proceeds to step 126.

At step 126, a predetermined roll rate threshold is indexed to provide a roll rate threshold based on the roll angle determined at step 124. As stated above, the roll rate threshold has a value functionally related to the roll angle. The threshold values are empirically determined for a particular vehicle platform and the roll rate sensor arrangement being used. The process then proceeds to step 128.

At step 128, a determination is made whether the roll rate and roll angle values define a point in quadrant I (e.g., see FIG. 2). This determination, for example, checks to see whether (i) the determined roll angle has a value that is greater than or equal to zero and (ii) the roll rate has a value that is greater than or equal to zero. If this determination is negative, indicating that the roll rate value (e.g., 32 of FIG. 1) is not in the first quadrant, the process proceeds to step 130.

At step 130, a determination is made whether the roll rate and roll angle values define a point that lies in quadrant III. For example, the determination is implemented by determining whether (i) the determined roll angle has a value that is less than or equal to zero and (ii) the roll rate has a value that is less than or equal to zero. If this determination is negative, the process returns to step 122. On the other hand, if the determination is affirmative, then the process proceeds to step 132. Consequently, the process advances to step 132 only if the roll rate and roll angle define a point that is in quadrant three. Other algorithms could be used to make the quadrant determination (steps 128, 130).

At step 132, a determination is made whether the roll rate value is less than the value of the indexed roll rate threshold. If this determination is negative, the process returns to step 122, indicating that no vehicle rollover condition exists. If, however, the determination is affirmative, indicating the roll rate has crossed the threshold value (i.e., roll rate is less than the threshold values), then the process proceeds to step 134.

If the determination at step 128 is affirmative, indicating that the roll rate value (e.g., 32 of FIG. 1) is in quadrant one, the process advances to step 133. At step 133, a determination is made as to whether the determined roll rate is greater than an indexed threshold value. If the determination is negative, the process returns back to step 122, indicating that no deployment crash event has started. If the determination at step 133 is affirmative, a TRUE logic signal is provided (e.g., indicating the occurrence of deployment crash event). After an affirmative determination at either step 132 or 133, the process proceeds to step 134.

At step 134, an indication of the occurrence of the determined vehicle rollover condition (step 132 or step 133) is latched TRUE. For example, a vehicle rollover TRUE condition signal is latched for a predetermined time period, such as about one second. From step 134, the process proceeds to step 136. At step 136, a determination is made whether the safing function is TRUE, such as a digital TRUE condition output signal being provided by one of the safing comparator functions (e.g., 86, 98, 106 of FIG. 1). If the safing function is not TRUE while the vehicle rollover condition is latched TRUE, the process returns to step 122. This is indicative of non-deployment rollover condition since a safing TRUE condition did not coincide with the roll rate value crossing a variable threshold value (in quadrant one or three).

In contrast, if the determination at step 136 is affirmative, indicating that at least one of the sating criteria has been satisfied (e.g., safing=TRUE), the process pro ceeds to step 140. At step 140, an appropriate vehicle occupant protection device (e.g., 112 of FIG. 1) is actuated to help protect a vehicle occupant during the occurrence of the detected vehicle rollover condition.

A vehicle rollover crash condition is complex, with many different factors potentially producing a rollover condition. Some factors that may contribute to a vehicle rollover condition include, for example, excessive lateral acceleration, path cross-slope on or off road, tripping interferences, such as curbs, soft ground or other obstructions. Consequently, rollover safing, such as with vertical and lateral accelerometers, may not occur simultaneously with the roll rate exceeding the roll rate threshold. Therefore, a safing ON condition signal is latched (e.g., by latch 78 of FIG. 1) for a predetermined time period, such as about one second. The rollover condition signal also is latched (e.g., by latch 74 of FIG. 1) for a predetermined time period of, for example, about one second. In this way, there is an increased likelihood that the latched safing ON condition signal and the latched rollover condition signal will overlap during a vehicle rollover condition. This overlap is required for, in accordance with the exemplary embodiments of FIGS. 1 and 3, determining the occurrence of a vehicle rollover condition.

Alternatively, the system could be implemented without a redundant safing determination. In this situation, actuation of the vehicle occupant protection device could be in controlled in response to the roll rate only crossing the rollover threshold.

FIGS. 4–9 illustrate vehicle roll rate dynamics plotted against the roll rate thresholds shown in FIG. 2 for different types of vehicle maneuvers. These include both rollover and non-rollover events. The variable roll rate threshold is indicated at $T_I$ and $T_{III}$ in quadrants I and III, respectively, for each of FIGS. 4–9. The sensed vehicle roll rate characteristics are shown as a series of dots in each figure as a function of the angle index (e.g., the value provided by roll angle indexing function 40 of FIG. 1).

Figure 4:
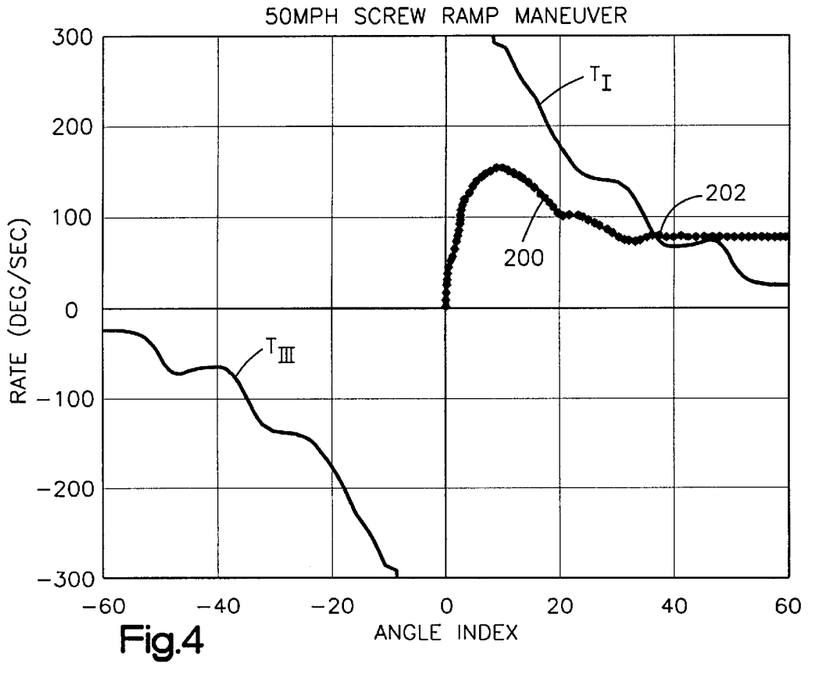
FIGS. 4–7 are graphical representations of roll rate versus roll angle index during various types of vehicle rollover conditions.

FIG. 4 shows an example of a 50 mile per hour screw ramp maneuver for a particular vehicle platform. In a screw ramp rollover condition, the vehicle leaves the ground and rolls after it hits a screw ramp. This rollover condition is characterized in that the vehicle roll rate is fast enough to roll the vehicle over a critical angle before its wheels hit the ground and it bounces the vehicle back to a normal orientation relative to the ground. The sensed roll rate values, indicated at 200 for corresponding indexed roll angle values, are shown by dots in the graph. The roll rate value crosses the threshold $T_I$ at a roll angle of about 35°, indicated at 202. Consequently, appropriate occupant protection device(s) would be actuated in this situation provided that one or more of the safing conditions also are satisfied.

Figure 5:
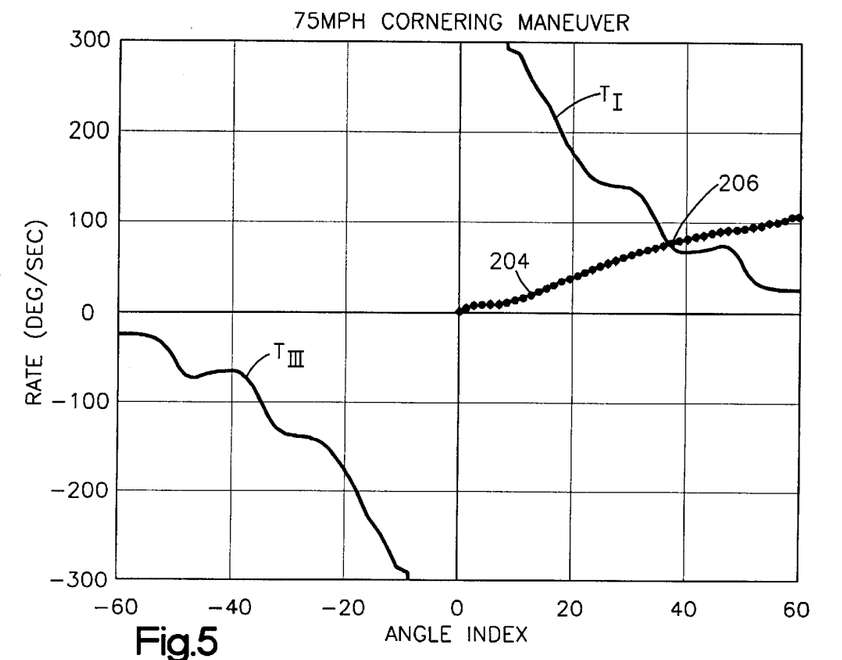

FIG. 5 shows an example of a 75 mile per hour cornering maneuver for a particular vehicle platform in which the vehicle steering is at about 7.5° relative to a center steering position. The values of the vehicle roll rate as a function of the roll angle index are represented by dots at 204. This type of rollover condition begins with a zero roll rate and the roll rate develops slowly due, at least in part, to the dynamics of tire force. The roll rate increases with an increase in the roll angle index, crossing the roll rate threshold $T_I$ at a roll angle of about 35°, indicated at 206. This indicates a vehicle rollover condition, which will result in actuation of appropriate occupant protection device(s) provided that at least one of the safing criteria also is satisfied.

Figure 6:
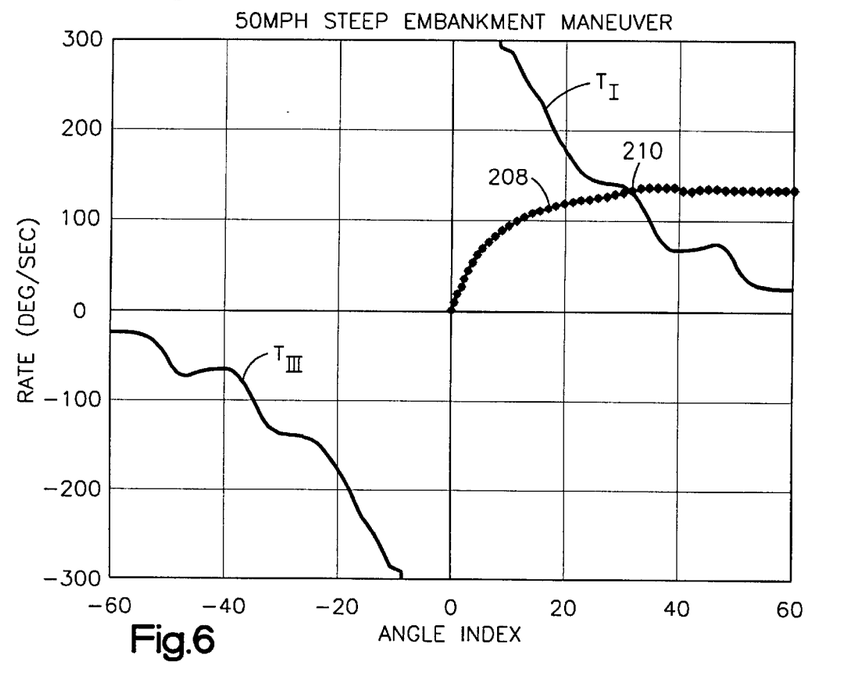

FIG. 6 shows an example of a rollover condition for a steep embankment maneuver at about 50 miles per hour. In a steep embankment maneuver, the vehicle travels along an embankment having an angle of at least about a 10° angle, which results in an initial angle for the vehicle about its long axis (e.g., the X-axis of FIG. 1). The roll rate values versus roll angle for the steep embankment maneuver are indicated by as series of dots at 208. The roll rate values 208 are similar to that of the cornering rollover condition of FIG. 5, although the roll rate initially increases more rapidly as function of roll angle. This is due to the initial angular orientation of the vehicle traveling on the embankment. A vehicle rollover condition is determined when the roll rate crosses the threshold $T_I$ at an indexed roll angle of about 30°, indicated at 210. An occupant protection device would be actuated provided that one of the safing criteria also is satisfied.

Figure 7:
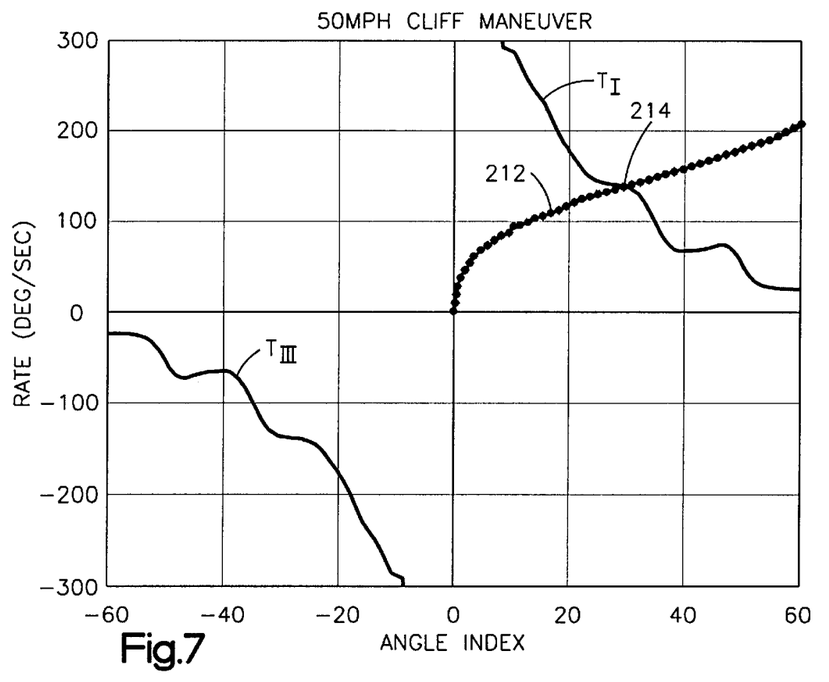

FIG. 7 shows an example of roll rate versus indexed roll angle for a 50 mile per hour cliff maneuver. In a cliff maneuver, the wheels of one side of the vehicle (e.g., driver side) are on the ground while the wheels on the other side (e.g., passenger side) are substantially free falling, such as being over an edge of a cliff. The plot of roll versus roll angle, indicated at 212, is similar to a steep embankment rollover. For this maneuver, the vehicle roll rate 212 crosses the roll rate threshold $T_I$ at an indexed roll angle of about 30°, indicated at 214. Appropriate occupant protection equipment would, thus, be actuated in this situation provided that at least one of the safing conditions also are met.

Figure 8:
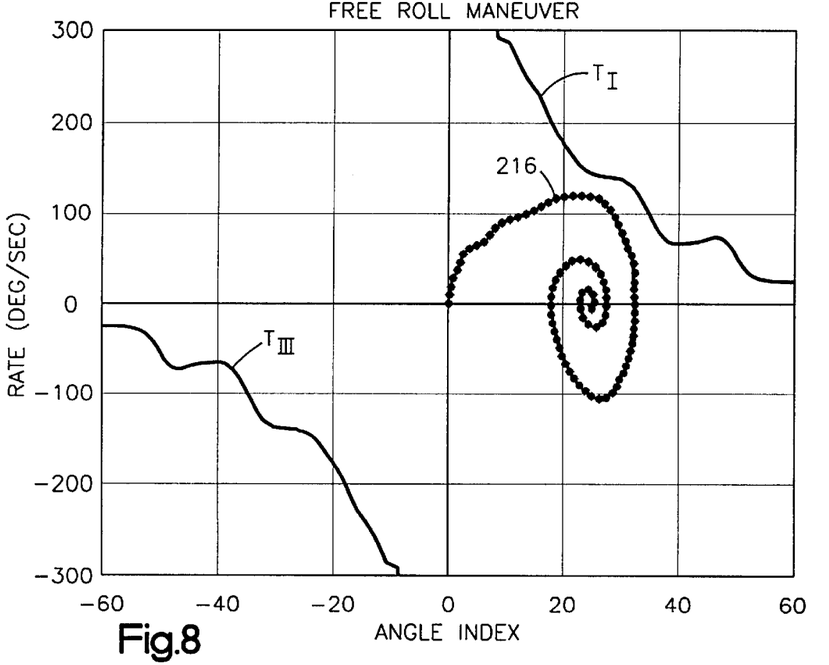
FIGS. 8 and 9 are graphical representations of roll rate versus roll angle index during vehicle non-rollover conditions.

FIG. 8 illustrates a free roll maneuver with an initial roll angle. The roll rate versus indexed roll angle is indicated at 216. This maneuver does not result in vehicle rollover, as the roll rate never exceeds the threshold $T_I$ for a given roll angle index value. In this maneuver, the vehicle changes between positive and negative roll rate values several times while maintaining a positive relative roll angle (i.e., the roll rate values are in quadrants one and two). Although the initial roll angle maybe greater than zero, the controller 26 begins integration of the vehicle roll rate signal 32 from zero.

Figure 9:
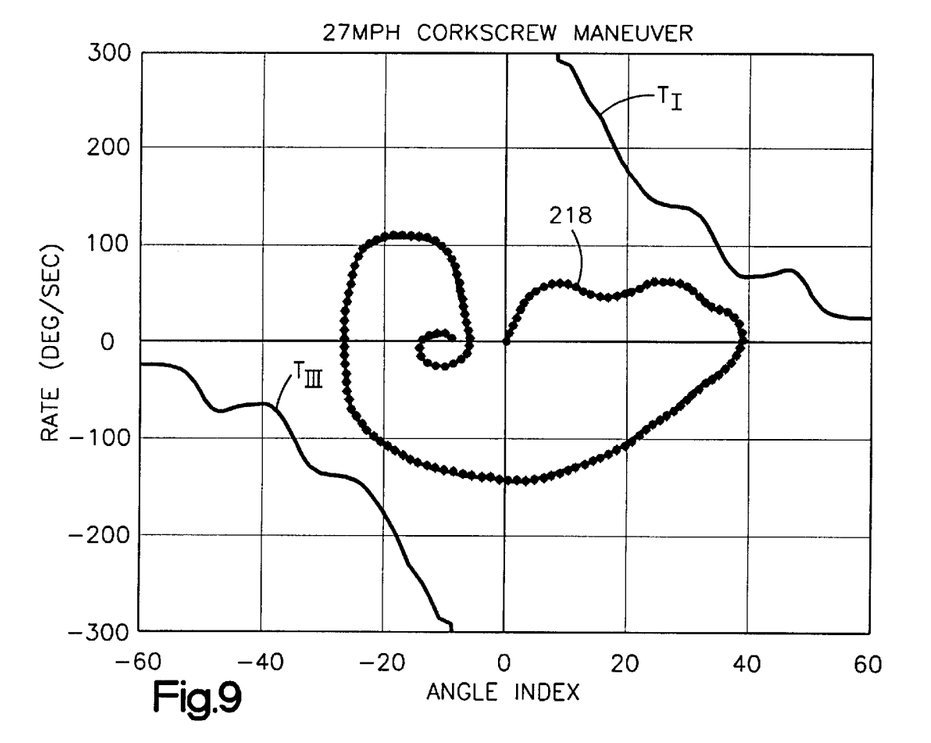

FIG. 9 is an example of a 27 mile per hour corkscrew maneuver. The roll rate versus roll angle values are represented as a series of dots 218. The roll rate values 218 include both positive and negative components, indicating angular rotation of the vehicle in opposite directions about the axis of the roll rate sensor (e.g., 14 of FIG. 1). However, the roll rate values 218 fail to cross threshold $T_I$ in quadrant I as well as fail to cross threshold $T_{III}$ in quadrant III. Consequently, no occupant protection devices would be actuated in this situation.

In view of the foregoing, the severity of rollover events can be divided into three categories as a function of the roll rate, namely, high, intermediate, and low severity events. Each type of rollover crash condition requires unique time-to-fire characteristics. The exemplary embodiment of the system described above, utilizes a threshold, which varies as a function of roll angle, to provide appropriate time-to-fire characteristics for each type of vehicle rollover condition.

From the above description of the invention, those skilled in the art will perceive improvements, changes and modifications. Such improvements, changes and modifications within the skill of the art are intended to be covered by the appended claims.

Having described the invention, the following is claimed:

1. A rollover sensing system comprising:

a roll rate sensor operative to sense a rate of rotation of a vehicle and to provide a roll rate signal having an electrical characteristic indicative thereof; and a controller connected to said roll rate sensor, said controller being operative to determine a roll angle of the vehicle based on the roll rate signal, said controller including a variable roll rate threshold having a value functionally related to roll angle, said controller determining the occurrence of a vehicle rollover condition in response to the sensed roll rate crossing said threshold.

2. A system as set forth in claim 1 wherein said rollover sensing system is used in an occupant protection system that includes an actuatable vehicle occupant protection device for, when actuated, helping protect a vehicle occupant during a vehicle rollover condition, said controller effecting actuation of said occupant protection device in response to determining the occurrence of a vehicle rollover condition.

3. A system as set forth in claim 2 further including an acceleration sensor for sensing vehicle acceleration and providing an acceleration signal having an electrical characteristic indicative of the sensed acceleration, said controller determining the occurrence of a vehicle rollover condition in response to (i) the sensed roll rate having a value that crosses said threshold value and (ii) the acceleration signal exceeding a threshold level.

4. A system as set forth in claim 2 further including first and second accelerometers for sensing vehicle acceleration along different axes which are both transverse to a direction of vehicle travel, said first accelerometer providing a first acceleration signal having an electrical characteristic indicative of the vehicle acceleration sensed thereby, said second accelerometer providing a second acceleration signal having an electrical characteristic indicative of the vehicle acceleration sensed thereby, said controller determining the occurrence of a vehicle rollover condition in response to the sensed roll rate having a value that crosses said threshold value, and at least one of (i) the first acceleration signal exceeding a first acceleration threshold and (ii) the second acceleration signal exceeding a second acceleration threshold.

5. A system as set forth in claim 2 wherein said controller compares the sensed roll rate with said threshold only if the direction of the determined roll angle and the sign of roll rate indicate a possibility of a rollover condition.

6. A system as set forth in claim 2 wherein said controller includes means for comparing the sensed roll rate with said threshold, said means for comparing being operative only if (i) said determined roll angle has a value greater than or equal to 0° and said roll rate has a value greater than or equal to 0° per unit time or (ii) said determined roll angle has a value less than or equal to 0° and said roll rate has a value less than or equal to 0° per unit time.

7. A method for sensing vehicle rollover, said method comprising the steps of:
    sensing a roll rate of rotation of the vehicle;
    determining a roll angle based on sensed roll rate;
    providing a variable roll rate threshold having a value functionally related to roll angle;
    determining whether the sensed roll rate crosses the roll rate threshold; and
    providing a control signal in response to determining that the roll rate crosses the threshold.

8. A method as set forth in claim 7 further including the step of actuating an occupant protection device in response to the control signal.

9. A method as set forth in claim 8 further including the step of sensing vehicle acceleration along an axis transverse to a direction of vehicle travel, the control signal being provided in response to (i) the sensed roll rate crossing the roll rate threshold value and (ii) the sensed acceleration exceeding an acceleration threshold.

10. A method as set forth in claim 9 further including sensing vehicle acceleration along two different axes transverse to a direction of vehicle travel, the control signal being provided in response to the sensed roll rate of having a value that crosses said roll rate threshold value and at least one of the sensed vehicle accelerations exceeding a corresponding acceleration threshold value.

11. A method as set forth in claim 7 further including the steps of comparing the sensed roll rate with the roll rate threshold value only when the direction of the determined roll angle and the sign of the sensed roll rate indicate a possibility of a rollover condition.

12. A method as set forth in claim 7 further including the steps of comparing the sensed roll rate with the threshold only if (i) the determined roll angle has a value greater than or equal to 0° and the roll rate has a value greater than or equal to 0° per unit time or (ii) the roll angle has a value less than or equal to 0° and the roll rate has a value less than or equal to 0° per unit time.

13. A rollover sensing system comprising:
    means for sensing a rate of rotation of a vehicle and providing a roll rate signal having an electrical characteristic indicative thereof; and
    control means for determining a roll angle of the vehicle based on the roll rate signal, said control means having a threshold that has a value functionally related to roll angle, said control means determining the occurrence of a vehicle rollover condition in response to the sensed roll rate crossing said threshold.

* * * * *